Figure 1:
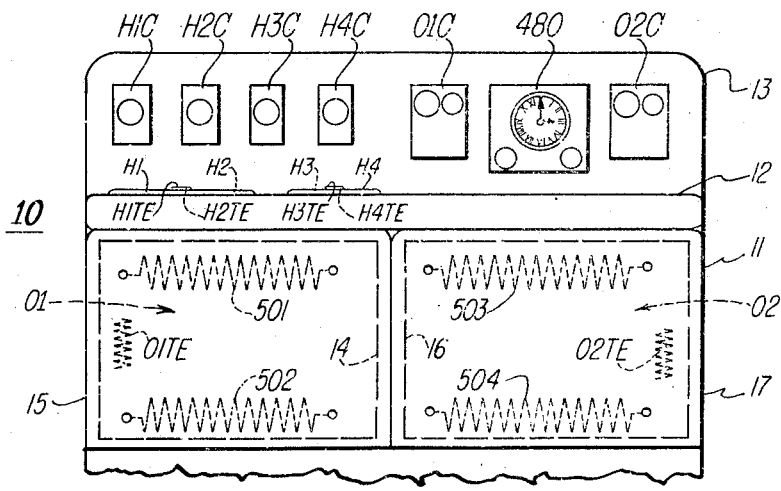

April 29, 1958     D. O. BAIRD     2,832,878
ELECTRIC COOKING APPLIANCES

Filed Nov. 25, 1955     5 Sheets-Sheet 1

INVENTOR.
Douglas O. Baird
BY
Smith, Olsen, Baird & Miller,
Attys

April 29, 1958     D. O. BAIRD     2,832,878
ELECTRIC COOKING APPLIANCES
Filed Nov. 25, 1955     5 Sheets-Sheet 2
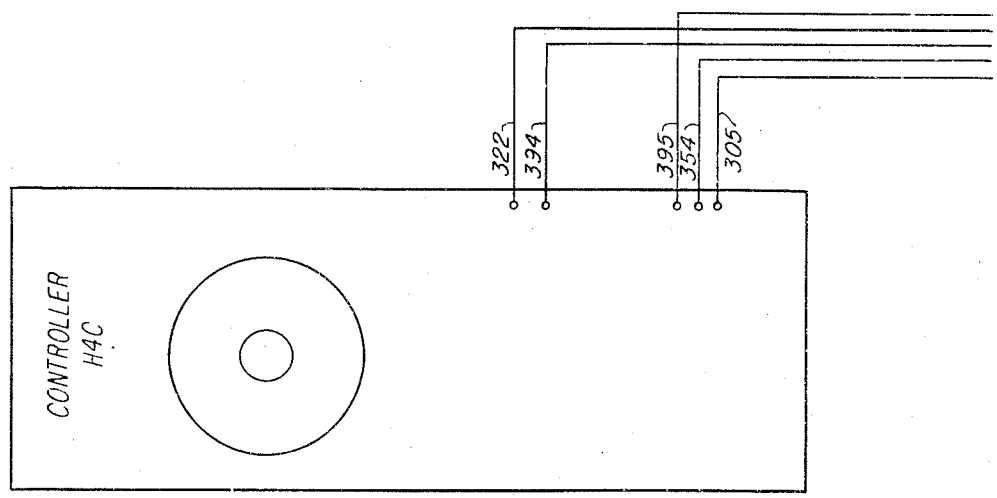
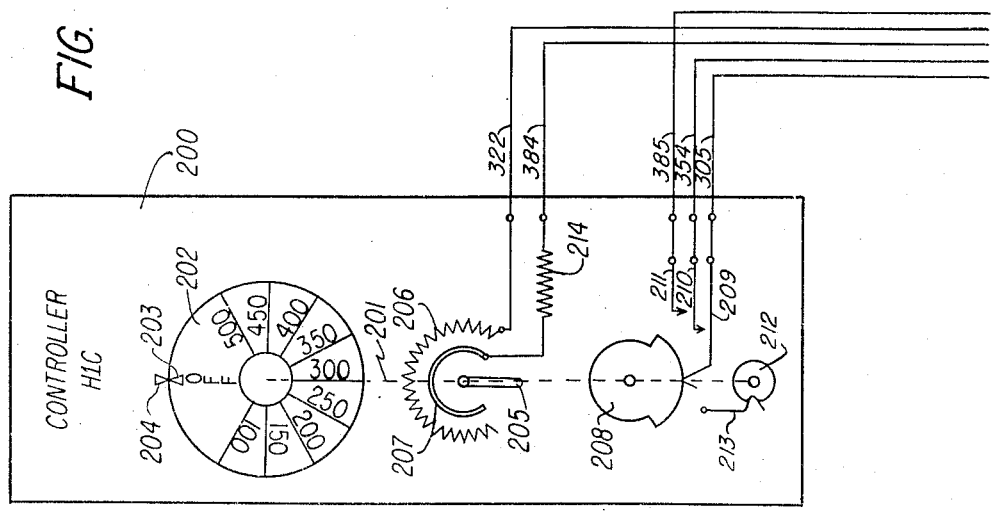
FIG. 2
INVENTOR.
Douglas O. Baird
BY
Smith, Olsen, Baird & Miller,
Attys.

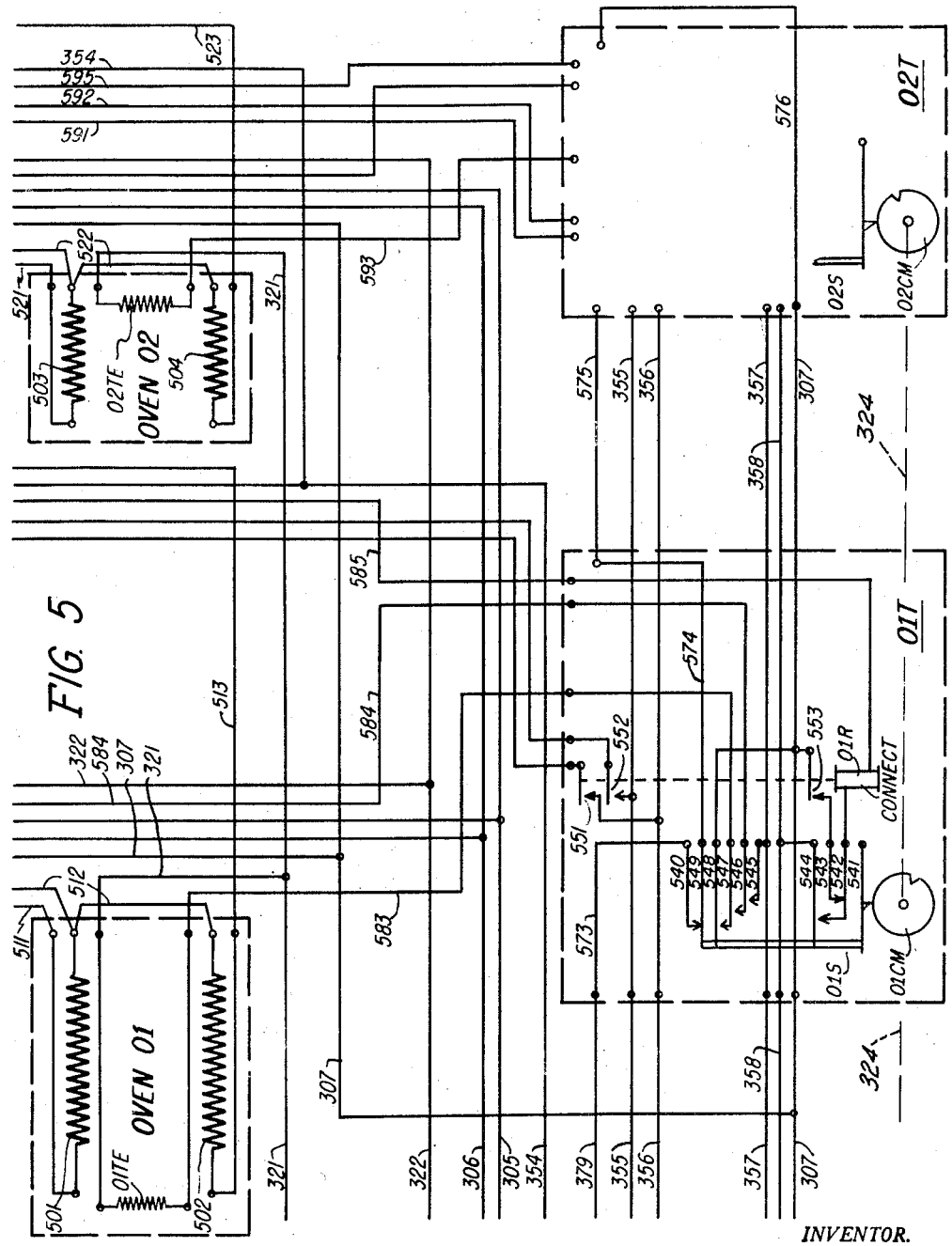

United States Patent Office 2,832,878
Patented Apr. 29, 1958

2,832,878

ELECTRIC COOKING APPLIANCES

Douglas O. Baird, Skokie, Ill., assignor to General Electric Company, a corporation of New York Application November 25, 1955, Serial No. 548,848

18 Claims. (Cl. 219—20)

The present invention relates to electric cooking appliances and more particularly to automatic temperature control systems for such appliances.

It is a general object of the invention to provide an automatic temperature control system for an electric range, or the like, that accommodates the independent presetting and subsequent corresponding independent maintaining of desired temperatures of a plurality of heating units incorporated in the range, and employing a substantial amount of common equipment including a common tester operative to compare the actual temperatures of the heating units and the preset desired temperatures thereof and for controlling the supply of electric power to the heating units as required by the comparisons mentioned.

Another object of the invention is to provide in an electric range, an automatic temperature control system of the character noted, wherein at least one of the heating units is operatively associated with a heating platform to provide a hotplate and at least another of the heating units is operatively associated with structure defining an oven.

A further object of the invention is to provide in an electric range, an automatic temperature control system of the character noted, wherein each of a plurality of hot-plates and each of a plurality of baking ovens are selectively controlled in order to maintain the desired preset individual temperatures thereof.

A further object of the invention is to provide in an electric cooking appliance, an automatic temperature control system of the character noted, wherein the tester is cyclically controlled in order to insure frequent comparisons of the actual temperatures of the heating units with respect to the preset desired temperatures thereof and corresponding frequent controls of the supply of electric power to the heating units as determined by the corresponding comparisons mentioned, while avoiding the objectionable flutter or hunting characteristic of a conventional continuous testing system.

A further object of the invention is to provide in a baking oven, an automatic temperature control system of the character noted, that accommodates both regular-bake and time-bake operations, wherein the controls proceed immediately in the regular-bake operation and proceed under the control of clock mechanism in the time-bake operation.

A further object of the invention is to provide in an electric cooking appliance, an automatic temperature control system of the character noted, that comprises facility for effecting heating of the individual heating units at respective high and low heating rates depending upon the comparisons previously mentioned and selectively governed in accordance with whether the comparisons indicate that the actual temperature of any given heating unit is substantially lower than or only moderately lower than the preset desired temperature thereof.

A further object of the invention is to provide in an electric cooking appliance, an automatic temperature control system of the character noted, wherein the sensing of the temperature of the heating unit previously mentioned is really a sensing of the temperature of a medium that is operatively associated with the heating unit, whereby the control setting facility may be calibrated directly in terms of the desired temperature of the medium that is heated by the heating unit.

A still further object of the invention is to provide an automatic electric heating control system of simple connection and arrangement and that is positive in operation.

Further features of the invention pertain to the particular arrangement of the elements of the automatic temperature control system, whereby the above-outlined and additional operating features thereof are attained.

Figure 6:
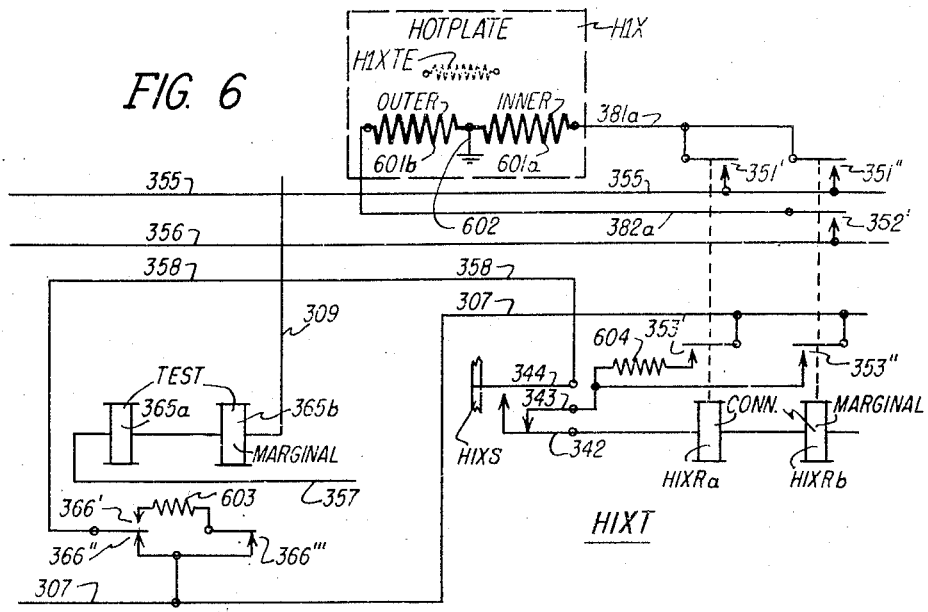

The invention, both as to its organization and method of operation, together with further objects and advantages thereof, will best be understood by reference to the following specification taken in connection with the accompanying drawings, in which:

Figure 1 is a fragmentary front elevational view of the upper portion of an electric cooking appliance in the form of an electric range incorporating an automatic temperature control system and embodying the present invention;

Figs. 2 to 5, inclusive, taken together, are a composite electric diagram of the automatic temperature control system incorporated in the electric range of Fig. 1; and Fig. 6 is a fragmentary portion of an electric diagram of a modified form of the automatic temperature control system that may be incorporated in the electric range of Fig. 1.

Figure 3:
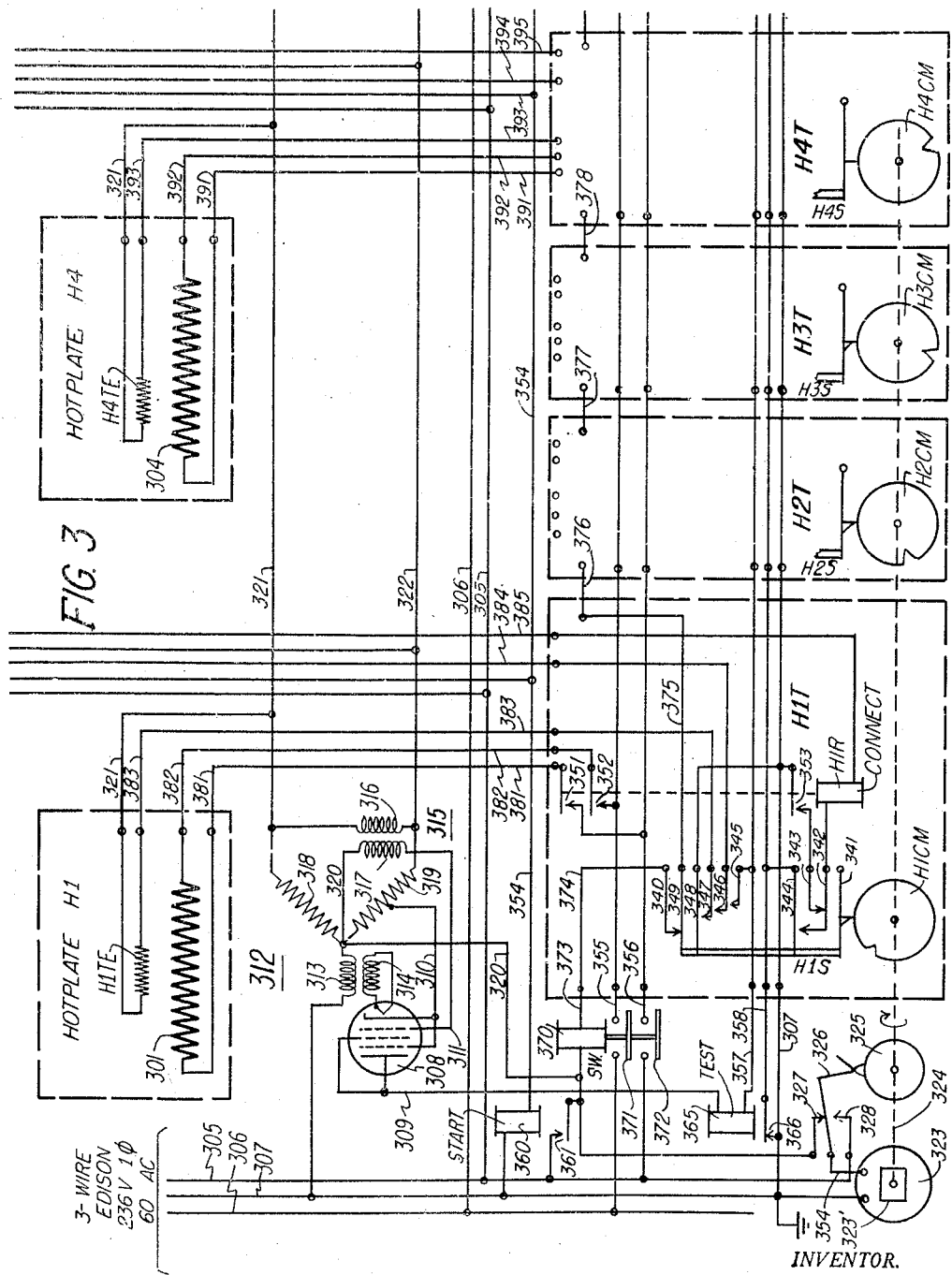
Figure 4:
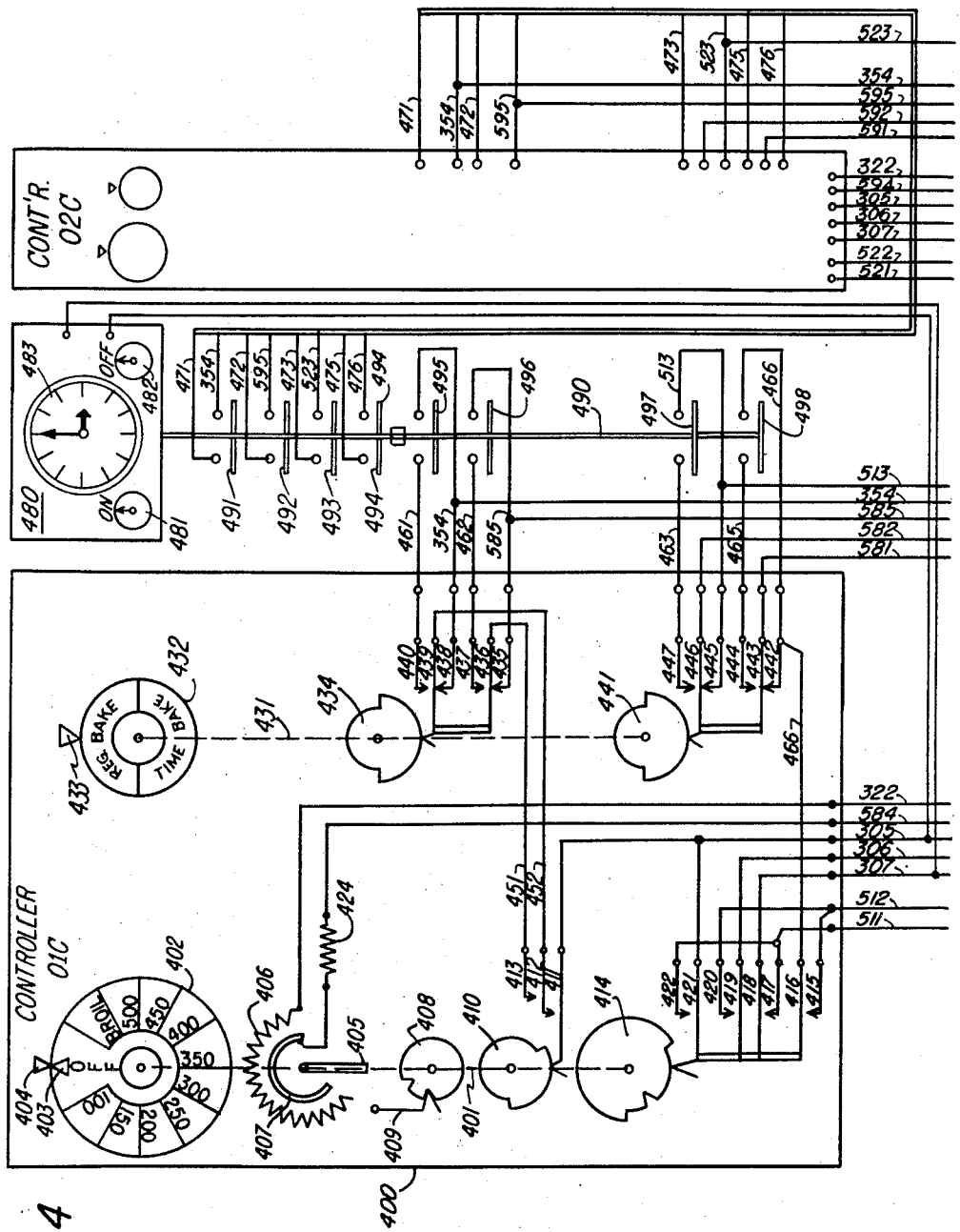

In order to form a unified diagram of Figs. 2 to 5, inclusive, each of the four corresponding sheets of drawings should be arranged in a horizontal position with Figs. 2 and 4 respectively above Figs. 3 and 5, and with Figs. 2 and 3 respectively to the left of Figs. 4 and 5, thereby providing a four-sheet block of the drawings mentioned. Also, it is noted that the fragmentary portion of the diagram of Fig. 6 comprises an alternative to a portion of the part of the unified diagram shown in Fig. 3, as explained fully hereinafter.

Referring now to Fig. 1 of the drawings, there is illustrated an electric cooking appliance 10 in the form of an electric range and incorporating an automatic temperature control system embodying the features of the present invention. The range 10 comprises an upstanding body 11 provided with a substantially horizontally disposed cooking top 12 supporting four surface heating units or hotplates H1, H2, H3 and H4 arranged in spaced-apart relation in a substantially rectangular pattern on the left-hand side thereof. The body 11 houses an oven O1 in the left-hand portion thereof and an oven O2 in the right-hand portion thereof. The cooking top 12 carries an upstanding backsplash 13 adjacent to the rear thereof that, in turn, carries four surface heating unit controllers H1C, H2C, H3C and H4C respectively corresponding to the four surface heating units H1, H2, H3 and H4, as well as two oven controls O1C and O2C respectively corresponding to the two ovens O1 and O2 and also clock mechanism 480. In the arrangement, the elements H1C, H2C, H3C, H4C, O1C, 480 and O2C may be disposed in a horizontal array from left-to-right upon the front of the backsplash 13 so that they are readily accessible for manual operation.

Each of the surface heating units or hotplates H1, etc., may be of the construction of that disclosed in the copending application of Robert J. Molyneaux and Kenneth H. Walkoe, Serial No. 397,874, filed December 14, 1953, and essentially comprises a heating unit that may be of fundamental construction disclosed in U. S. Patent No. 2,563,443, granted on August 21, 1951, to Oliver G. Vogel and Francis E. Kirk, and embodying a helical coil or spiral of a heating element of the metal sheath-helical resistance conductor type disclosed in U. S. Patent No. 1,367,341, granted on February 1, 1921, to Charles C. Abbott. Accordingly, the hotplate H1 comprises a plurality of turns or convolutions of heating element arranged in radially spaced-apart relation and defining a cooking platform adapted to support and to heat a cooking vessel, or the like; which platform has a centrally disposed opening therein in which there is movably mounted a temperature sensing unit that is biased into cooperating relation with the bottom wall of a supported cooking vessel. In the temperature sensing unit, there is incorporated a temperature sensing element that is preferably in the form of "thermistor" material. This temperature sensing element has a high negative temperature coefficient of resistance, and the material may consist of sintered aluminum oxide and an oxide of magnesium, manganese, titanium, iron, nickel, cobalt, zinc, etc. For example, the thermistor may have the exceedingly high negative temperature coefficient of resistance of: —0.044 ohm/ ohm/° C.; whereby the characteristic thereof may be as follows:

| Temperature (° C.): | Total resistance (ohms) |
| --- | --- |
| 25 | 100,000 |
| 50 | 34,000 |
| 100 | 6,000 |
| 150 | 1,700 |
| 200 | 580 |

As indicated in Fig. 1, the hotplates H1, H2, H3 and H4 respectively comprise the temperature sensing elements or thermistors H1TE, H2TE, H3TE and H4TE; and in Fig. 3 only the hotplates H1 and H4 are illustrated; whereby the hotplate H1 comprises the heating unit 301 and the temperature sensing element or thermistor H1TE, and the hotplate H4 comprises the heating unit 304 and the temperature sensing element or thermistor H4TE.

Each of the ovens O1 and O2 may be of substantially conventional construction including a metal liner thermally insulated from the range body 11 and defining an oven cavity in which there is arranged a composite heating unit including an upper heating element disposed just below the top wall of the oven liner and a lower heating element disposed just above the bottom wall of the oven liner, as well as a temperature sensing element or thermistor of the character previously described. In each oven O1, etc., the temperature sensing element or thermistor is arranged to sense the temperature within the oven cavity; whereby it is located to be heated mutually by the hot oven gases and the adjacent wall of the oven liner. As indicated in Figs. 1 and 5, the oven O1 comprises the upper heating element 501 and the lower heating element 502, as well as the temperature sensing element or thermistor O1TE that may be arranged in the left-hand side wall of the associated oven liner; while the oven O2 comprises the upper heating element 503 and the lower heating element 504, as well as the temperature sensing element or thermistor O2TE that may be arranged in the right-hand side wall of the associated oven liner. As indicated in Fig. 1, the oven O1 is provided with the metal liner 14 having an open front and provided with the cooperating front door 15, while the oven O2 is provided with the metal liner 16 having an open front and provided with the cooperating front door 17, the front doors 15 and 17 being mounted for hinged movements about the lower edges thereof upon the range body 11.

The controllers H1C, etc., are identical; whereby the controller H1C comprises, as shown in Fig. 2, a casing 200 housing a rotatably mounted operating shaft 201 carrying a manually operable control knob or dial 202 on the outer end thereof. The dial 202 carries temperature indicia 100, 150, etc., corresponding to degrees F., as well as an off index 203, that cooperate with an index marker 204 carried by the cover of the associated casing 200. Also the operating shaft 201 carries a wiper 205 that cooperates with an adjustable resistor 206 and a conducting segment 207, as well as an insulating cam 208 that controls a set of switch springs including the individual switch springs 209, 210 and 211. Further, the operating shaft 201 carries a cam 212 that cooperates with a biasing spring 213 so as to establish the off position thereof. In the arrangement, when the dial 202 occupies its off position, the wiper 205 disengages both the resistor 206 and the conducting segment 207, and the cam 208 operates the switch spring 209 to disengage the switch spring 210 in order to cause the switch spring 210 to disengage the switch spring 211. When the dial 202 is rotated out of its off position by an angle of about 60° and into its variable on position, the wiper 205 engages both the resistor 206 and the conducting segment 207 bridging the same together, and the cam 208 operates the switch spring 209 to engage the switch spring 210 so as to cause the switch spring 210 to engage the switch spring 211 in order that the switch springs 209, 210 and 211 are electrically connected together. Of course, in the variable on position of the dial 202, the wiper 205 variably adjusts the portion of the resistor 206 that is included in the external circuit.

Finally, the controller H1C comprises a fixed resistor 214, as well as five vertically arranged terminals that are employed for exterior wiring. In the arrangement, the uppermost terminal is connected to one extremity of the resistor 206; the next lower terminal is connected to one extremity of the resistor 214 and the next three lower terminals are respectively connected to the switch springs 211, 210 and 209, the other extremity of the resistor 214 being connected to the conducting segment 207.

The controllers O1C and O2C are identical; whereby the controller O1C comprises, as shown in Fig. 4, a casing 400 housing a rotatably mounted operating shaft 401 carrying a manually operable control knob 402 on the outer end thereof. The dial 402 carries temperature indicia 100, 150, etc., corresponding to degrees F., as well as a broil index and an off index 403, that cooperate with an index marker 404 carried by the cover of the associated casing 400. Also the operating shaft 401 carries a wiper 405 that cooperates with an adjustable resistor 406 and a conducting segment 407, as well as two insulating cams 410 and 414. The cam 410 controls a set of switch springs including the individual switch springs 411, 412 and 413; while the cam 414 controls a set of switch springs 415 to 422, inclusive. Further, the operating shaft 401 carries a cam 408 that cooperates with a biasing spring 409 so as to establish the off and broil positions thereof. In the arrangement, when the dial 402 occupies its off position, the wiper 405 disengages both the resistor 406 and the conducting segment 407, the cam 410 operates the switch spring 411 to disengage the switch spring 412 in order to cause the switch spring 412 to disengage the switch spring 413, and the cam 414 operates the switch springs 416, 418, 419 and 421 respectively to disengage the switch springs 415, 417, 420 and 422. When the dial 402 is rotated out of its off position by an angle of about 30° in the clockwise direction or about 90° in the counterclockwise direction into its variable on position, the wiper 405 engages both the resistor 406 and the conducting segment 407 bridging the same together, the cam 410 operates the switch spring 411 to engage the switch spring 412 so as to cause the switch spring 412 to engage the switch spring 413 in order that the switch springs 411, 412 and 413 are electrically connected together, and the cam 414 operates the switch springs 416 and 418 respectively to engage the switch springs 415 and 417 and operates the switch springs 419 and 421 into further disengagement with respect to the respective switch springs 420 and 422. Of course, in the variable on position of the dial 402 the wiper 405 variably adjusts the position of the resistor 406 that is included in the external circuit. When the dial 402 is rotated out of its off position by an angle of about 300° in the clockwise direction or about 60° in the counterclockwise direction into its broil position, the cam 414 operates the switch springs 419 and 421 into respective engagements with the switch springs 420 and 422 and operates the switch springs 416 and 418 into further disengagement with respect to the respective switch springs 415 and 417.

Further the controller O1C comprises a fixed resistor 424, as well as seven horizontally arranged terminals that are employed for exterior wiring. In the arrangement, the leftmost terminal is commonly connected to the switch springs 417 and 422; the next adjacent terminal to the right is commonly connected to the switch springs 415 and 420; the next adjacent terminal is connected to the switch spring 418; the next adjacent terminal is connected to the switch spring 419; the next adjacent terminal is commonly connected to the switch springs 421 and 411; the next adjacent terminal is connected to one extremity of the fixed resistor 424; and the rightmost terminal is connected to one extremity of the adjustable resistor 406, the other extremity of the fixed resistor 424 being connected to the conducting segment 407.

Also the casing 400 of the controller O1C houses a rotatably mounted operating shaft 431 carrying a manually operable control knob or dial 432 on the outer end thereof. The dial 432 carries regular bake indicia and time bake indicia that cooperate with an index marker 433 carried by the cover of the associated casing 400. Also the operating shaft 431 carries two insulating cams 434 and 441; the insulating cam 434 controls a set of switch springs, including the individual switch springs 435 to 440, inclusive; and the insulating cam 441 controls a set of switch springs, including the individual switch springs 442 to 447, inclusive. In the arrangement, when the dial 432 occupies its regular bake position of about 180°, the cam 434 operates the switch spring 436 to engage the switch spring 435 and to disengage the switch spring 437 and operates the switch spring 439 to engage the switch spring 438 and to disengage the switch spring 440, while the cam 441 operates the switch spring 443 to engage the switch spring 442 and to disengage the switch spring 444 and operates the switch spring 446 to engage the switch spring 445 and to disengage the switch spring 447. On the other hand, when the dial 432 occupies its time bake position of about 180°, the cam 434 operates the switch spring 436 to engage the switch spring 437 and to disengage the switch spring 435 and operates the switch spring 439 to engage the switch spring 440 and to disengage the switch spring 438, while the cam 441 operates the switch spring 443 to engage the switch spring 444 and to disengage the switch spring 442 and operates the switch spring 446 to engage the switch spring 447 and to disengage the switch spring 445.

Finally the controller O1C comprises ten vertically arranged terminals that are employed for exterior wiring. In the arrangement, the topmost and nine next adjacent lower terminals are respectively connected to the switch springs 440, 438, 437, 435, 447, 446, 445, 444, 443 and 442. Furthermore, the switch springs 413 and 436 are interconnected by a conductor 451; the switch springs 412 and 439 are interconnected by a conductor 452; and the switch springs 416 and 442 are interconnected by a conductor 446.

The clock mechanism 480, as shown in Fig. 4, may be of conventional construction including a synchronous drive motor of the "Telechron" type, not shown, a clock face 483, a manually operable on clock time setting knob or dial 481 and a manually operable off clock time setting knob or dial 482. Further, the clock mechanism 480 comprises an operating shaft 490 carrying eight contact bridging members 491 to 498, inclusive, provided with associated pairs of contacts. In the arrangement, the setting dials 481 and 482 are set to respective on clock times and off clock times; whereby the operating shaft 490 is operated from its restored position at the set on clock time and returned back into its restored position at the set off clock time, so that the contact bridging members 491, etc., control the associated contacts during the time interval between the set on clock time and the set off clock time in a conventional manner.

The control further comprises, as shown in Figs. 3 and 5, a three-wire Edison source of 236 volts, single-phase, 60 cycle, A. C., including two outside conductors 305 and 306 and a grounded neutral conductor 307, as well as a synchronous timer motor 323 that may be of the "Telechron" type. The timer motor 323 is provided with a reduction gear box 323' and an operating shaft 324 that is rotated therefrom at a constant rate, such, for example, as one revolution per minute, this rate being chosen entirely arbitrarily and depending altogether upon the reduction ratio of the gears in the gear box 323'. The operating shaft 324 carries an insulating control cam 325 that governs a set of switch springs, including three individual switch springs 326, 327 and 328. Also the circuit comprises four test units H1T, H2T, H3T, and H4T respectively corresponding to the hotplates H1, H2, H3 and H4, and two test units O1T and O2T respectively corresponding to the ovens O1 and O2.

The test units H1T, etc., are identical; whereby the test unit H1T, shown in Fig. 3, comprises a control cam H1CM, a connect relay H1R, a set of switch springs H1S, six left-hand terminals, five top terminals and one right-hand terminal; and likewise, the test unit OT1, shown in Fig. 5, comprises a control cam O1CM, a connect relay O1R, a set of switch springs O1S, six left-hand terminals, five top terminals and one right-hand terminal. The set of switch springs H1S is governed by the control cam H1CM and comprises ten individual switch springs 341 to 340, inclusive; and the set of switch springs O1S is governed by the control cam O1CM and comprises ten individual switch springs 541 to 540, inclusive. Of course, the test units H2T, H3T, H4T and O2T comprise the respective control cams H2CM, H3CM, H4CM and O2CM, and the respectively associated sets of switch springs H2S, H3S, H4S and O2S. In the arrangement, the control cams H1CM, H2CM, etc., are staggered or displaced angularly and rigidly secured to the operating shaft 324, so that in each revolution of the operating shaft 324 the sets of switch springs H1S, H2S, etc., are sequentially operated. In the present example, each of the sets of switch springs H1S, H2S, etc., may occupy its normal position illustrated for 59 seconds of the 1-minute cycle and its operated position for 1 second of the 1-minute cycle, and the staggering of the cams H1CM, H2CM, etc., may be such that one of the sets of switch springs H1S, H2S, etc., is operated every 10 seconds. Thus in the arrangement, the set of switch springs H1S is actuated from its normal position into its operated position and back into its normal position in 1 second; 9 seconds later the set of switch springs H2S is actuated from its normal position into its operated position and back into its normal position in an additional second; 9 additional seconds later the set of switch springs H3S is actuated from its normal position into its operated position and back into its normal position in an additional second; etc.; whereby this cycle is repeated once every minute.

Again referring to Fig. 3, in the test unit H1T, the six left-hand terminals from the bottom up respectively terminate six conductors 307, 358, 357, 356, 355 and 373; the five top terminals from the left to the right respectively terminate five conductors 381, 382, 383, 384 and 385; and the single right-hand terminal terminates a conductor 376. The connect relay H1R is provided with three sets of contacts 351, 352 and 353; one terminal of the winding of the connect relay H1R is connected to the switch spring 342, and the other terminal of the winding thereof is connected to the rightmost top terminal. The topmost left terminal is connected by a conductor 374 to the switch spring 340; the next lower left terminal is connected to one contact of the contact set 352; the next lower left terminal is connected to one contact of the contact set 351; the next lower left terminal is connected to the switch spring 345; the next lower left terminal is connected to the switch spring 344; and the bottom left terminal is connected to the switch spring 348. The leftmost top terminal is connected to the other contact of the set 351; the next adjacent top terminal is connected to the other contact of the set 352; the next adjacent top terminal is connected to the switch spring 347; and the next adjacent top terminal is connected to the switch spring 346. The switch spring 349 is connected by a conductor 375 to the single right-hand terminal; the switch spring 343 is connected to one contact of the set 353; and the other contact of the set 353 is connected to the bottom left terminal.

Again referring to Fig. 5, in the test unit O1T the six left-hand terminals from the bottom up respectively terminate six conductors 307, 358, 357, 356, 355 and 379; the five top terminals from the left to the right respectively terminate five conductors 581, 582, 583, 584 and 585; and the single right-hand terminal terminates a conductor 575. The connect relay O1R is provided with three sets of contacts 551, 552 and 553; one terminal of the winding of the connect relay O1R is connected to the switch spring 542 and the other terminal of the winding thereof is connected to the rightmost top terminal. The topmost left terminal is connected by a conductor 573 to the switch spring 540; the next lower left terminal is connected to one contact of the contact set 552; the next lower left terminal is connected to one contact of the contact set 551; the next lower left terminal is connected to the switch spring 545; the next lower left terminal is connected to the switch spring 544; and the bottom left terminal is connected to the switch spring 548. The leftmost top terminal is connected to the other contact of the set 551; the next adjacent top terminal is connected to the other contact of the set 552; the nex adjacent top terminal is connected to the switch spring 547; and the next adjacent top terminal is connected to the swtich spring 546. The switch spring 549 is connected by a conductor 574 to the single right-hand terminal; the switch spring 543 is connected to one contact of the set 553; and the other contact of the set 553 is connected to the bottom left terminal.

As indicated in Fig. 3, the twelve terminals of the test unit H4T, in the clockwise direction, respectively terminate the conductors: 307, 358, 357, 356, 355, 378, 391, 392, 393, 394, 395 and 379. Similarly, as indicated in Fig. 5, the twelve terminals of the test unit O2T, in the clockwise direction, respectively terminate the conductors: 307, 358, 357, 356, 355, 575, 591, 592, 593, 594, 595 and 576. Thus, in the arrangement a chain circuit extends through the test units H1T, etc., O2T, from the conductor 373 to the neutral line 307 and including the conductors 374, 375, 376, 377, 378, 379, 573, 574, 575 and 576.

Further, the automatic temperature control circuit comprises, as illustrated in Fig. 3: a start relay 360 provided with a single set of contacts 361; a test relay 365 provided with a single set of contacts 366; and a switch relay 370 provided with two contact bridging members 371 and 372 controlling two corresponding associated contact pairs. Also, the automatic temperature control system comprises a tester including a vacuum tube 308 of the pentode type, and a Wheatstone bridge circuit including two fixed resistance arms 318 and 319 connected in series relation between a pair of test conductors 321 and 322, as well as a transformer 315 provided with inductively coupled primary and secondary windings 316 and 317. The tube 308 is provided with a cathode heating transformer 312 including inductively coupled primary and secondary windings 313 and 314.

In the arrangement, the midpoint between the resistance arms 318 and 319 is connected to a conductor 320; the primary winding 313 is bridged between the neutral line 307 and the conductor 320; the secondary winding is bridged across the cathode heater of the tube 308; the primary winding 316 is bridged across the test conductors 321 and 322; and the secondary winding 317 is bridged across the conductor 320 and a conductor 311. In the tube 308: the anode and the screen grid are connected in multiple to a conductor 309; the cathode and the suppressor grid are connected in multiple to a conductor 310; and the control grid is connected to the conductor 311. The conductor 310 is connected to a tap provided on the resistance arm 319; the winding of the start relay is bridged between the neutral line 307 and a start conductor 354; the winding of the test relay 365 is bridged between the conductors 309 and 357; and the winding of the switch relay 370 is bridged between the conductors 320 and 373. One of the contacts of the set 361 is connected to the outside line 305 and the other contact thereof is connected to the conductor 320; one of the contacts of the set 366 is connected to the neutral line 307 and the other contact thereof is connected to the conductor 358; the conductor 320 is also connected to the switch spring 327; the outside line 305 is also connected to the switch spring 328; the switch spring 326 is connected to a conductor 354; and the terminals of the timer motor 325 are respectively connected to the neutral line 307 and to the conductor 354. The contacts of the pair governed by the bridging member 371 are respectively connected to the outside line 306 and to the conductor 355; and the contacts of the pair governed by the bridging member 372 are respectively connected to the outside line 305 and to the conductor 356.

The heating unit 301 of the hotplate H1 is bridged across the conductors 381 and 382; while the thermistor H1TE of the hotplate H1 is bridged across the test conductor 321 and the conductor 383. The heating unit 304 of the hotplate H4 is bridged across the conductors 391 and 392; while the thermistor H4TE of the hotplate H4 is bridged across the test conductors 321 and the conductors 393. The upper heating element 501 of the oven O1 is bridged cross a pair of conductors 511 and 512; the lower heating element 502 of the oven O1 is bridged across the conductor 512 and a conductor 513; while the thermistor O1TE of the oven O1 is bridged across the test conductor 321 and the conductor 583. Similarly, the upper heating element 503 of the oven O2 is bridged across a pair of conductors 521 and 522; the lower heating element 504 of the oven O2 is bridged across the conductor 522 and a conductor 523; while the thermistor O2TE of the oven O2 is bridged across the test conductor 321 and the conductor 593.

The five terminals of the controller H1C from top to bottom are respectively connected to the test conductor 322, the conductor 384, the conductor 385, the start conductor 354 and the outside line 305; and the five terminals of the controller H4C from top to bottom are respectively connected to the test conductor 322, the conductor 394, the conductor 395, the start conductor 354 and the line conductor 305. In the controller O1C, the seven bottom terminals are connected left to right respectively to the conductor 511, the conductor 512, the neutral line 307, the outside line 306, the outside line 305, the conductor 584 and the test conductor 322; while ten right-hand terminals are connected top to bottom respectively to a conductor 461, the start conductor 354, a conductor 462, the conductor 585, a conductor 463, the conductor 582, the conductor 513, a conductor 465, the conductor 581 and a conductor 466. In the controller O2C, the seven bottom terminals are connected left to right respectively to the conductor 521, the conductor 522, the neutral line 307, the outside line 306, the outside line 305, the conductor 594 and the test conductor 322; while the ten right-hand terminals are connected top to bottom respectively to a conductor 471, the start conductor 354, a conductor 472, the conductor 595, a conductor 473, the conductor 592, the conductor 523, a conductor 475, the conductor 591 and a conductor 476.

In the clock mechanism 480: the contact pair controlled by the bridging member 491 respectively terminate the conductor 471 and the start conductor 354; the contact pair controlled by the bridging member 492 respectively terminate the conductors 472 and 595; the contact pair controlled by the bridging member 493 respectively terminate the conductors 473 and 523; the contact pair controlled by the bridging member 494 respectively terminate the conductors 475 and 476; the contact pair controlled by the bridging member 495 respectively terminate the conductor 461 and the start conductor 354; the contact pair controlled by the bridging member 496 respectively terminate the conductors 462 and 585; the contact pair controlled by the bridging member 497 respectively terminate the conductors 463 and 513; and the contact pair controlled by the bridging member 498 respectively terminate the conductors 465 and 466. Finally, the clock mechanism 480 comprises a pair of terminals that are directly connected across the outside line 305 and the neutral line 307; whereby the clock mechanism 480 serves the usual electric clock function.

Considering now the operation of the automatic temperature control system shown in Figs. 2 to 5, inclusive, when each of the controllers H1C, etc., O2C occupies its off position, the multiple circuits for operating the start relay 360 are open; whereby the latter relay occupies its restored position so that the tube 308 is non-conductive, the test relay 365 and the switch relay 370 are restored, each of the connect relays H1R, etc., is restored, and the timer motor 323 is at rest in its normal position as illustrated. Of course, each of the hotplates H1, etc., and each of the ovens O1, etc., is deenergized, and it may be assumed that each of these elements is cool at this time; whereby the circuit is completely released.

Now assuming that a cooking operation is to be carried out upon the hotplate H1, the food is placed in the cooking vessel and the cooking vessel is placed in its supported position upon the hotplate H1 in engagement with the heating unit 301 and in good heat exchange relationship with the thermistor H1TE, in the usual manner. The cook then operates the manual dial 202 of the controller H1C out of its off position into its variable operated position in accordance with the desired temperature of the supported cooking vessel, causing the corresponding temperature index carried by the manual dial 202 to match the index marker 204. For example, the index 300° F. carried by the manual dial 202 may be brought into registry with the index marker 204, the dial 202 being rotated in either direction, as desired; whereby the wiper 205 carried by the shaft 201 engages the contact segment 207 and the variable resistor 206 including a corresponding portion of the variable resistor 206 in series relation with the fixed resistor 214 between the conductors 322 and 384. Also the insulating cam 208 operates the associated set of switch springs so that the individual switch springs 209, 210 and 211 are electrically connected together. The closure of the switch springs 209-210 connects the outside line 305 to the start conductor 354 thereby completing a circuit for operating the start relay 360. Upon operating the start relay 360 completes at the contacts 361, a connection from the outside line 305 to the conductor 320 thereby completing a circuit including the switch springs 327 and 326, as well as the neutral line 307, for initiating operation of the timer motor 323 so that the operating shaft 324 is driven out of its home position on a timed basis of 1 R. P. M. When the operating shaft 324 is driven out of its home position, the control cam 325 operates the switch spring 326 to disengage the switch spring 327 and to engage the switch spring 328, whereby the start circuit for operating the timer motor 323 is interrupted and a holding circuit for operating the same is completed. At this point, it is noted that once the operating shaft 324 is driven out of its home position, it must be rotated at least one complete revolution so that the control cam 325 may again operate the switch spring 326 to disengage the switch spring 328 and to re-engage the switch spring 327, thereby again to test the conductor 320 to determine that the start relay 360 still occupies its operated position. Accordingly, upon each revolution of the operating shaft 324, the timer motor 323 tests to determine that the start relay 360 still occupies its operated position.

Also the application of potential upon the conductor 320 completes a circuit for energizing the primary winding 313 of the heater transformer 312, whereby the secondary winding 314 thereof effects heating of the cathode of the tube 308 rendering the same electron-emissive. Further, the application of potential upon the conductor 320 completes the previously mentioned chain circuit between the outside line 305 and the neutral line 307 and extending through each of the test units H1T, etc., O2T, so that the switch relay 370 is operated. Upon operation, the switch relay 370 connects the outside lines 306 and 305 at the contact bridging members 371 and 372 respectively to the conductors or buses 355 and 356 that extend in multiple to each of the test units H1T, etc., O2T; however, the buses 355 and 356 are not connected through to the hotplate H1 at this time by virtue of the restored position of the connect relay H1R in the corresponding test unit H1T.

At the expiration of a time interval of 9 seconds following initiation of operation of the timer motor 323, the control cam H1CM is rotated so as to actuate the set of switch springs H1S in the test unit H1T; whereby the switch spring 344 engages the switch spring 342 causing the switch spring 342 to disengage the switch spring 343; the switch spring 348 engages the switch spring 347 operating the same into engagement with the switch spring 346 and operating the same into engagement with the switch spring 345, and the switch spring 349 disengages the switch spring 340. When the switch spring 349 disengages the switch spring 340 the previously traced chain circuit for operating the switch relay 370 is interrupted, thereby to cause the latter relay to restore so as to disconnect, at the contact bridging members 371 and 372, the outside lines 306 and 305 from the buses 355 and 356, thereby to insure that the subsequent operation of the connect relay H1R does not perform a current switching function.

At this time: the neutral conductor 307 is connected via the switch springs 348 and 347 to the conductor 383 and via the thermistor H1TE to the test conductor 321; and also the neutral conductor 307 is connected via the switch springs 348, 347 and 346 to the conductor 384 and via the fixed resistor 214 and the included portion of the variable resistor 206 to the test conductor 322. Accordingly, a Wheatstone bridge is completed including the arms 318, 319, H1TE and 214—206; which Wheatstone bridge is supplied between the conductor 320 and the neutral line 307, whereby the Wheatstone bridge is either balanced or unbalanced, depending upon the match between the resistance of the thermistor H1TE and the resistance of the fixed resistor 214 and the included portion of the variable resistor 206. In the present example, this Wheatstone bridge circuit is greatly unbalanced by virtue of the fact that the heating unit 301 is cool so that the thermistor H1TE is cool and consequently has an exceedingly high resistance. Thus the Wheatstone bridge being unbalanced causes a large current to traverse the primary winding 316 of the transformer 315 between the test conductors 321 and 322, whereby, a large biasing voltage is induced in the secondary winding 317 of the transformer 315, so that a high negative bias is applied to the conductor 311 and consequently to the control grid of the tube 308 so that the tube 308 is biased to cutoff, so that no ocurrent traverses the plate circuit thereof. The open plate circuit of the tube 308 extends from the neutral conductor 307 via the switch springs 348, 347, 346 and 345, the conductor 357, the winding of the test relay 365 and the conductor 309 to the anode, and further extends from the cathode via the conductor 310, and the left-hand portion of the arm 319 to the conductor 320 that is connected via the contacts 361 to the outside line 305. Accordingly, at this time, by virtue of the substantial mismatch between the resistance of the thermistor H1TE and the fixed resistor 214 plus the variable resistor 206, the unbalanced Wheatstone bridge effects the bias of the tube 308 to cutoff, so that the test relay 365 is retained in its restored position in order that the closed contacts 366 thereof complete a pickup circuit for operating the connect relay H1R. The pickup circuit extends from the neutral conductor 307 via the contacts 366, the conductor 358, the switch springs 344 and 342, the winding of the connect relay H1R, the conductor 385 and the switch springs 211, 210 and 209 to the outside line 305. Accordingly, the connect relay H1R operates to prepare at the contacts 353, a holding circuit for energizing the winding thereof; and completes at the contacts 351 and 352 connections between the conductors 381 and 382 and the buses 356 and 355, the conductors 381 and 382 extending to the heating unit 301 of the hotplate H1.

Momentarily after the cam H1CM and the test unit H1T operates the set of switch springs H1S in the manner described above, it returns the same back into its normal position, whereby the switch spring 342 engages the switch spring 343 before the switch spring 344 disengages the switch spring 342. Accordingly, the previously mentioned holding circuit for energizing the winding of the connect relay H1R is completed at the switch springs 343 and 342, prior to the interruption of the previously traced pickup circuit for energizing the winding of the connect relay H1R at the switch springs 344 and 342. Also the switch spring 348 disengages the switch spring 347, causing the latter to disengage the switch spring 346, and causing the latter to disengage the switch spring 345. Also the switch spring 349 re-engages the switch spring 340 thereby to recomplete the previously traced chain circuit for operating the switch relay 370, so that the latter relay recompletes at the contact bridging members 371 and 372, the power connections to the buses 355 and 356 that are at this time extended via the contacts 352 and 351 and the conductors 382 and 381 to the heating unit 301 of the hotplate H1. Accordingly, at this time, the testing of the match or mismatch between the thermistor H1TE and the fixed resistor 214 plus the variable resistor 206 has been completed and the heating unit 301 is now energized so as to effect heating of the hotplate H1 and consequently the supported cooking vessel and its contents with the result that the thermistor H1TE in good heat exchange relation with the bottom wall of the cooking vessel is heated so as to reduce the resistance thereof as the temperature thereof rises.

The overall test time interval of the test unit H1T may be 1 second, as previously explained, whereby at the conclusion of an additional time interval of 9 seconds, the cam H2CM in the test unit H2T effects operation of the set of switch springs H2S. More particularly, the test unit H2T brings about testing, in the event the controller H2C occupies its operated position, of the match or mismatch between the fixed resistor plus the variable resistor incorporated therein and the thermistor H2TE associated with the hot plate H2; which operation of the test unit H2T is effective momentarily to interrupt the previously traced chain circuit and then to recomplete the same, whereby the switch relay 370 is restored and then reoperated during this test time interval. In the present example, it may be assumed that the controller H2C occupies its off position so that the corresponding connect relay H2R in the test unit H2T is not operated.

In view of the foregoing, it will be understood that the test units H3T, H4T, O1T and O2T are sequentially operated in a similar manner in a closed cycle, whereby following the conclusion of the first cycle, the test unit H1T is again operated in the next or second cycle of operation of the timer motor 323 so that the match or mismatch between the thermistor H1TE and the fixed resistor 214 plus the variable resistor 206 is again tested by the Wheatstone bridge circuit. Of course, in the present example, the mismatch is still substantial, although not as great as the initial mismatch, since during the first cycle of the timer motor 323, the heating unit 301 was repeatedly energized. At this point, it is mentioned that in each cycle, the heating unit 301 is repeatedly energized and deenergized six times, since there are six of the test units H1T, etc.; and in each instance the heating unit 301 is energized for 9 seconds and deenergized for 1 second. Accordingly, in each cycle, the heating unit 301 is effectively energized at full voltage across the outside lines 305 and 306 during a composite time interval of 54 seconds of the overall cycle time interval of 60 seconds, or 90% of the overall cycle time interval.

The operation of the temperature control circuit proceeds through successive cycles in the manner described above as long as the controller H1C occupies other than its off position, whereby the match or mismatch between the thermistor H1TE and the fixed resistor 214 plus the variable resistor 206 is repeatedly tested in the manner described; whereby ultimately after an appropriate time interval a substantial match between the elements mentioned is tested by the Wheatstone bridge circuit. Specifically at this time, and upon operation of the set of switch springs H1S, the resistance of the thermistor H1TE substantially matches that of the fixed resistor 214 plus the variable resistor 206, whereby the Wheatstone bridge is substantially balanced so that no substantial potential appears between the test conductors 321 and 322, whereby no substantial current traverses the primary winding 316 of the transformer 315, so that no substantial negative bias is applied to the control grid of the tube 308, whereby the tube 308 fires each time the neutral conductor 307 is positive with respect to the outside line 305 in each cycle of the alternating current supply. Accordingly, the corresponding current impulses in the plate circuit of the tube 308 effect energization and consequent operation of the test relay 365 so that it opens its contacts 366 disconnecting the conductor 358 from the neutral line 307 with the result that the connect relay H1R is deenergized and restores. Upon restoring, the connect relay H1R interrupts, at the contacts 353, a further point in the holding circuit for energizing the winding thereof, and interrupts, at the contacts 351 and 352, the connections between the buses 356 and 355 and the conductors 381 and 382 extending to the heating unit 301. At this point, it is noted that the opening of the contacts 351 and 352 incident to the restoration of the connect relay H1R is during a time interval when the switch relay 370 occupies its restored position, so that the disconnection of the conductors 381 and 382 from the buses 356 and 355 does not constitute a current interrupting function.

Subsequently, when the set of switch springs H1S in the test unit H1T is returned into its normal position, the connect relay H1R occupies its restored position and the switch relay 370 is reoperated, whereby current is not supplied to the heating unit 301 by virtue of the open contacts 351 and 352 of the restored connect relay H1R. As time proceeds, the temperature of the heating unit 301 subsides thereby increasing the degree of the mismatch between the resistance of the thermistor H1TE and the fixed resistor 214 plus the variable resistor 206 so that ultimately in some subsequent test cycle the mismatch mentioned is adequate to cause the Wheatstone bridge circuit to bias the tube 308 substantially to cutoff, or at least sufficiently that the plate current is insufficient in the test period to effect operation of the test relay 365. When the test relay 365 is thus not operated in the test period, the connect relay H1R is operated, so as again to connect at the contacts 351 and 352 the buses 356 and 355 to the heating unit 301; whereby subsequently to this test operation of the test unit H1T, the switch relay 370 is reoperated so as again to effect heating of the heating unit 301. Thereafter the heating unit 301 is again heated an appropriate time interval so as again to effect a substantial match between the resistance of the thermistor H1TE and the fixed resistor 214 plus the variable resistor 206, with the result that the test relay 365 is operated to bring about the restoration of the connect relay H1R in the test unit H1T. This cyclic operation continues as long as the manual dial 202 of the controller H1C occupies its operated position, whereby the arrangement is periodically controlled to effect the required heating of the heating unit 301 so that the hotplate H1 is maintained at a temperature corresponding substantially to that set by the manual dial 202 of the controller H1C as determined by the set resistance of the variable resistor 206.

Subsequently, when the controller H1C is returned back into its off position, and assuming that no other of the controller H2C, etc., occupies its operated position, the path for applying potential to the start conductor 354 is interrupted. Specifically, the cam 208 in the controller H1C operates the switch springs 211, 210 and 209 into disengagement, whereby the outside line 305 is disconnected from the start conductor 354. Thus, the start relay 360 restores removing potential from the conductor 320 with the result that further operation of the tube 308 is arrested and the switch relay 370 and the test relay 365 remain in their restored positions. However, operation of the timer 323 is continued until the operating shaft 324 is returned back into its home position causing the switch spring 326 to disengage the switch spring 328 and to engage the switch spring 327. At this time, further operation of the timer motor 323 is arrested, since no potential appears upon the conductor 320 as the start relay 360 occupies its restored position.

Reverting to the operation of the Wheatstone bridge circuit, when the controller H1C occupies its operated position, it will be appreciated that the higher the temperature setting of the manual dial 202, then the smaller the amount of the variable resistor 206 is included in the external circuit via the test conductor 322 and the conductor 384, whereby it is necessary for the resistance of the thermistor H1TE to be at a lower value in order to obtain the required match, and of course the lower values of the thermistor H1TE are attained only in response to higher temperatures thereof. Accordingly, it will be appreciated that the adjustment or setting of the manual dial 202 of the controller H1C in its operated position is operative to establish the effective resistance of the variable resistor 206 and consequently the point of match with respect to the thermistor H1TE and at which a balance of the Wheatstone bridge circuit is achieved thereby to establish the desired temperature of the hotplate H1, or really the bottom wall of the cooking vessel supported thereby, with which the thermistor H1TE is in good heat exchange relation.

In view of the foregoing explanation of the mode of operation of the temperature control system to maintain the desired temperature of the hotplate H1 as established by the controller H1C, it will be understood that the operation thereof to establish the temperature of any one or the other hotplates H2, etc., under the control of the associated controller H2C, etc., is the same as that described above; and moreover, it will be appreciated that the operation of the system is in nowise fundamentally modified by the fact that a plurality of the controllers H1C, H2C, H3C and H4C may be operated simultaneously. In the last mentioned case, the system is operative to maintain the temperature of each of the hotplates H1, H2, etc., at the temperature preset by the corresponding controller H1C, H2C, etc., and regardless of the individual values of the set temperatures within the range of operation thereof. For example, the controllers H1C, H2C, H3C and H4C might be set respectively to establish the temperatures 200° F., 250° F., 300° F. and 350° F. for the respective hotplates H1, H2, H3 and H4; whereby the system is operated to maintain the four hotplates mentioned at the corresponding four temperatures mentioned in the cyclic operation thereof.

Now assuming that a broiling operation is to be carried out in the oven O1, the cook merely operates the manual dial 402 of the controller O1C into its broil position, without reference to the position of the manual dial 432 thereof. When the manual dial 402 is thus operated into its broil position, one of the notches provided in the cam 408 cooperates with the spring 409 positively to locate the broil position of the operating shaft 401; the cam 410 retains the switch springs 411, 412 and 413 in their open positions; while the cam 414 operates the associated set of switch springs so that the individual switch springs 419 and 421 respectively engage the associated switch springs 420 and 422, thereby to energize the upper heating unit 501 directly across the outside lines 305 and 306. The last mentioned connection includes, in addition to the switch springs 419—420 and 421—422, the conductors 512 and 511; whereby the upper heating unit 501 is energized to bring about the production of intense heat in the upper portion of the oven O1 for the broiling purpose. The broiling operation of the oven O1 is governed entirely upon a manual basis and without reference to the automatic temperature control system; whereby the start relay 360 is not operated incident to operation of the manual dial 402 of the controller O1C into its broil position.

At the conclusion of the broiling operation in the oven O1, the cook merely returns the manual dial 402 of the controller O1C back into its off position so that the cam 408 cooperating with the spring 409 locates this position of the operating shaft 401, whereby the insulating cam 414 returns the switch springs 419 and 421 into respective disengagements with the switch springs 420 and 422 so as to interrupt the previously traced circuit for energizing the upper heating unit 501 across the outside lines 305 and 306.

Now assuming that a regular bake operation is to be carried out in the oven O1, the cook first insures that the manual dial 432 of the controller O1C is operated into its regular bake position, as illustrated, so that the cam 434 retains the switch springs 439 and 436 into respective engagements with the switch springs 438 and 435 and so that the cam 441 retains the switch springs 446 and 443 in respective engagements with the switch springs 445 and 442. Next, the cook operates the manual dial 402 of the controller O1C out of its off position and into the particular temperature section of its variable on position that is desired, the indicia carried by the manual dial 402 cooperating with the index marker 404. When the manual dial 402 is thus operated into its variable on position, the wiper 405 engages the conducting segment 407 and the variable resistor 406 including a corresponding portion thereof, together with the fixed resistor 424, between the test conductor 322 and the conductor 584. Also the cam 410 operates the switch springs 411, 412 and 413 into engagements so as to connect the conductors 452 and 451 to the outside line 305; and the cam 414 operates the switch springs 418 and 416 to engage the respective switch springs 417 and 415.

At this time, the outside line 305 is connected via the switch springs 411 and 412, the conductor 452 and the switch springs 439 and 438 to the start conductor 354, so as to bring about operation of the start relay 360, in the manner previously explained. Also, the outside line 305 is connected via the switch springs 411, 412 and 413, the conductor 451 and the switch springs 436 and 435 to the conductor 585 extending to the test unit O1T; the upper heating unit 501 is bridged across the conductors 511 and 512; the conductor 511 is extended via the switch springs 417 and 418 to the neutral conductor 307; and the conductor 512 is extended via the switch springs 415 and 416, the conductor 446 and the switch springs 442 and 443 to the conductor 581 extending to the test unit O1T. Further, the lower heating unit 502 is bridged across the conductors 512 and 513; the conductor 512 is extended via the previously traced path to the conductor 581; and the conductor 513 is extended via the switch springs 445 and 446 to the conductor 582; and the conductors 581 and 582 extend to the test unit O1T. Finally, the thermistor O1TE is connected between the test conductor 321 and the conductor 583 extending to the test unit O1T.

In the subsequent operation of the automatic temperature control system, the cam O1CM in the test unit O1T operates the set of switch springs O1S, whereby the neutral conductor 307 is connected commonly to the conductors 583 and 584 so that the thermistor O1TE is connected between ground potential and the test conductor 321 and the fixed resistor 424 and the included portion of the variable resistor 406 are connected between ground potential and the test conductor 322, thereby to establish the balance or unbalance of the Wheatstone bridge circuit by virtue of the match or mismatch between the resistance of the thermistor O1TE and the composite resistance of the fixed resistor 424 and the included portion of the variable resistor 406. In the present example, when the oven O1 is cool, the mismatch mentioned is pronounced so that the Wheatstone bridge circuit is substantially unbalanced in order to govern the tube 308 so that the test relay 365 is not operated; whereby the connect relay O1R in the test unit O1T is operated; and subsequently the switch relay 370 is reoperated, all in the general manner previously explained in conjunction with the operation of the test unit H1T in connection with the hotplate H1. The operated connect relay O1R completes at the contacts 553 a holding circuit for energizing the winding thereof; and completes at the contacts 551 and 552 connections between the power buses 356 and 355 and the conductors 581 and 582. Accordingly, at this time: the upper heating unit 501 is energized between the neutral line 307 and the outside line 305; while the lower heating unit 502 is energized across the outside lines 305 and 306. Thus considerable heat is generated by the lower heating unit 502 in the lower portion of the oven O1 and some heat is generated by the upper heating unit 501 in the upper portion of the oven O1, which arrangement is substantially ideal for baking purposes.

The cyclic operation of the test unit O1T is substantially identical to that previously described in conjunction with the test unit H1T, whereby ultimately the temperature of the oven O1 reaches substantially that set by the manual dial 402, so that in the next cycle of the test unit O1T, there is a substantial match between the resistance of the thermistor O1TE and the composite resistance of the fixed resistor 424 and the variable resistor 406, whereby the Wheatstone bridge circuit is substantially balanced, so that the tube 308 is rendered conductive to bring about operation of the test relay 365 and the consequent restoration of the connect relay O1R, while the switch relay 370 occupies its restored position. The restoration of the connect relay O1R interrupts at the contacts 551 and 552 the connections extending to the upper heating unit 501 and the lower heating unit 502 in the oven O1, whereby the subsequent reoperation of the switch relay 370 is not effective to bring about further energization of the heating units 501 and 502 in order that the temperature of the oven O1 may subside. In some subsequent cycle of the test unit O1T, the mismatch between the thermistor O1TE and the fixed resistor 424 plus the variable resistor 406 will be tested as substantial, so that the Wheatstone bridge circuit will be substantially unbalanced with the result that the tube 308 is not rendered sufficiently conductive to effect operation of the test relay 365, so that the connect relay O1R will be operated in order that upon the subsequent reoperation of the switch relay 370, the heating units 501 and 502 of the oven O1 will be again energized. The cyclic operation and control of the heating of the oven O1 by the test unit O1T is in no way fundamentally different from that previously described in conjunction with the operation of the test unit H1T in connection with the hotplate H1. Accordingly, the test unit O1T is operated to cause the automatic temperature control circuit to maintain the temperature of the oven O1 substantially at that preset by the manual dial 402. Subsequently at the conclusion of the regular bake operation, the cook returns the manual dial 402 into its off position illustrated, whereby potential is removed from the start conductor in the controller O1C so as to effect the restoration of the start relay 360 in the event none of the other controls H1C, etc. and O2C occupies its operated position.

In view of the foregoing, it will be understood that the composite operation of the test unit O1T is governed jointly by the thermistor O1TE and by the fixed resistor 424 plus the variable resistor 406, so that any temperature in the range set by the manual dial 402 is maintained in the oven O1 in the operation of the automatic temperature control system.

In view of the foregoing description of the mode of operation of the test unit O1T in conjunction with the controller O1C and the oven O1, it will be understood that the operation of the test unit O2T in conjunction with the controller O2C and the oven O2 is identical in a regular bake operation. Further, it will be appreciated that the temperature controls respectively set up by the controllers O1C and O2C for the respective ovens O1 and O2 are maintained independently of each other based upon the sensings of the respective thermistors O1TE and O2TE in conjunction with the settings of the respective controllers O1C and O2C.

Now assuming that a time bake operation is to be carried out in the oven O1, the cook first insures that the manual dial 432 of the controller O1C is operated into its time bake position, so that the cam 434 operates the switch springs 439 and 436 respectively to disengage the switch springs 438 and 435 and respectively to engage the switch springs 440 and 437, and so that the cam 441 operates the switch springs 446 and 443 respectively to disengage the switch springs 445 and 442 and respectively to engage the switch springs 447 and 444. Next, the cook sets the clock mechanism 480; and specifically the on clock time dial 481 is set at the clock time at which it is desired that the baking operation is to start, and specifically the off clock time dial 482 is set at the clock time at which it is desired that the baking operation is to stop. For example, the manual dials 481 and 482 may be set at the respective on clock time of 6:00 P. M. and off clock time of 7:00 P. M.; whereby the time bake operation will be carried on between 6:00 P. M. and 7:00 P. M., as explained below. Finally, the cook operates the manual dial 402 of the controller O1C out of its off position and into the particular temperature section of its variable on position that is desired, in the manner previously explained.

In this example, the outside line 305 is connected via the switch springs 411 and 412, the conductor 452 and the switch springs 439 and 440 to the conductor 461; however, the conductor 461 is not connected through to the start conductor 354 by virtue of the open position of the contact bridging member 495 carried by the operating shaft 490 of the clock mechanism 480, as it is assumed that it is not yet 6:00 P. M. Accordingly operation of the automatic temperature control system is not initiated at this time, but rather it is merely prepared, as the controls are shifted from the controller O1C to the clock mechanism 480 in order that the subsequent control of the automatic temperature control system may be governed by the clock mechanism 480.

Now at the on clock time of 6:00 P. M., the clock mechanism 480 is governed, so that the operating shaft 490 is elevated, so that all of the contact bridging members 491 to 498, inclusive, close the associated contact pairs. Thus at the on clock time of 6:00 P. M., the contact bridging member 495 connects the conductor 461 to the start conductor 354 to bring about operation of the start relay 360, so as to initiate cyclic operation of the automatic temperature control system, in the manner previously explained. In this case, the connection from the test conductors 321 extends via the thermistor O1TE to the conductor 583 as before; and the connection from the test conductor 322 extends via the included portion of the variable resistor 406 and the fixed resistor 424 to the conductor 584 as before. The connection for energizing the upper heating unit 501 extends from the conductor 511 via the switch springs 417 and 418 to the neutral conductor 307 and extends from the conductor 512 via the switch springs 415 and 416, the conductor 466, the contact bridging member 498, the conductor 465 and the switch springs 444 and 443 to the conductor 581; while the connection for energizing the lower heating unit 502 extends from the conductor 512 via the above traced path to the conductor 581 and extends from the conductor 513 via the contact bridging member 497, the conductor 463 and the switch springs 447 and 446 to the conductor 582. Finally, the outside line 305 is connected via the switch springs 411, 412 and 413, the conductor 451, the switch springs 436 and 437, the conductor 462 and the contact bridging member 496 to the conductor 585 extending to the test unit O1T.

Accordingly at this time, the operation of the automatic temperature control system proceeds, the cooperation between the test unit O1T and the controller O1C to govern the heating of the oven O1 being the same as that previously described.

Now at the off clock time of 7:00 P. M., the clock mechanism 480 is controlled to effect the return of the operating shaft 490 into its normal restored position so that the contact bridging members 491 to 498, inclusive, open the associated contact pairs. The contact bridging members 498 and 497 interrupt points in the circuits for energizing the heating units 502 and 501 in the oven O1; the contact bridging member 496 interrupts the test circuit for operating the connect relay O1R in the test unit O1T; and the contact bridging member 495 interrupts the path for applying potential to the start conductor 354 in the controller O1C; whereby further time bake operation in the oven O1 is terminated.

In view of the foregoing, it will be understood that the essential control of the temperature of the oven O1 that is carried out by the test unit O1T under the control of the thermistor O1TE and the controller O1C in a time bake operation is in nowise different from that that is carried out in a regular bake operation; however, the clock mechanism 480 does establish the particular clock time interval during which the controls are exercised, as previously explained.

At the conclusion of the time bake operation, the manual dial 402 of the controller 102 should be returned back into its normal position so that the heating of the oven O1 will not be subsequently recycled by the clock mechanism 480 the next day between the clock time intervals of 6:00 P. M. and 7:00 P. M., in the manner previously explained.

In view of the foregoing description of the cooperation between the controller O1C and the clock mechanism 480 in the control of the test unit O1T for the purpose of governing the time bake operation in the oven O1, it will be understood that the cooperation between the controller O2C and the clock mechanism 480 in the control of the test unit O2T for the purpose of governing the time bake operation in the oven O2 is substantially identical. In this connection, it is mentioned that simultaneous time bake operations may be carried out in the ovens O1 and O2 under the respective controls of the controllers O1C and O2C, and at two different set temperatures, if desired; however, the clock time interval during which the controls are carried out must be the same, since the single clock mechanism 480 is common to the two controllers O1C and O2C. Specifically, the contact bridging members 491, 492, 493 and 494 bear the same relationship to the control circuits for the oven O2 that are borne by the contact bridging members 495, 496, 497 and 498 to the control circuits for the oven O1. Of course, it will be understood that any one of the cooking operations involving broiling, regular bake and time bake may be carried out in either one of the ovens O1 or O2 without reference to which of these operations might be independently carried out in the other of these ovens, except that the clock time interval of two time bake operations respectively carried out in the two ovens O1 and O2 will be concurrent because of the common arrangement of the clock mechanism 480, as noted above.

Reconsidering the overall operation of the temperature control arrangement, it will be understood that the carrying out of cooking operations on any one of the four hotplates or in either one of the two ovens may be effected independently of each other by the automatic temperature control system, since the control of any one of the six items mentioned is governed by its associated individual controller. Thus it follows that each of the controls H1C, etc., O1C and O2C must be returned back into its off position in order to insure the removal of potential from the start conductor 354 and the consequent restoration of the start relay 360 for the purpose of arresting the cyclic operation of the automatic temperature control system.

Referring now to Fig. 6, a modified form of the automatic temperature control system is illustrated that contemplates a hotplate H1X, corresponding to the hotplate H1, and a test unit H1XT, corresponding to the test unit H1T. In the hotplate H1X, the heating unit is divided into inner and outer sections 601a and 601b, the junction therebetween being connected to ground potential (the neutral line 307) via a conductor 602; and the outside terminals of the sections 601a and 601b being respectively connected to two conductors 381a and 382a, respectively corresponding to the conductors 381 and 382.

In the arrangement, the test relay is divided in the common circuit into two sections 365a and 365b, the test relay 365b being marginal, for a purpose more fully explained hereinafter; and similarly, the connect relay in the test unit H1XT is divided into two sections H1XRa and H1XRb, the connect relay H1XRb being marginal, for a purpose more fully explained hereinafter.

In the arrangement, when the connect relay H1XRa is operated alone, it completes at its contacts 351′ a connection between the bus 355 and the conductor 381a so that only the inner section of the heating unit 601a is energized; on the other hand, when both of the connect relays H1XRa and H1XRb are operated, the connect relay H1XRb completes at its contacts 351″ and 352′ connections between the buses 355 and 356 and the respective conductors 381a and 382a so that both of the sections of the heating unit 601a and 601b are energized. Accordingly, it will be understood that when the connect relay H1XRa is operated alone, the heating rate of the hotplate H1X is substantially less than when the connect relay H1XRb is operated.

Moreover, in the arrangement the windings of the two test relays 365a and 365b are energized in series relation between the conductors 309 and 357 as before, whereby it is possible to operate the test relay 365a, without operation of the marginal test relay 365b, or to operate both of these test relays depending upon the current traversing the conductor 309 and consequently the plate circuit of the tube 308.

The mode of operation of the modified form of the automatic temperature control system of Fig. 6 is predicated upon the circumstance that the plate current of the tube 308 is dependent upon the balance or unbalance of the Wheatstone bridge circuit, whereby one or both of the test relays 365a and 365b may be operated depending upon the value of the plate current of the tube 308. Specifically, when there is a substantial mismatch between the resistance of the thermistor H1XTE and the composite resistance of the fixed resistor 214 and the variable resistor 206, which is the case when the temperature of the hotplate H1X is considerably below the preset temperature, the Wheatstone bridge circuit is substantially unbalanced so that the tube 308 is biased to cutoff in order that neither of the test relays 365a or 365b is operated. Thus in this case, ground potential appearing upon the neutral conductor 307 is connected directly via the contacts 366'' to the conductor 358 with the result that operation of the set of switch springs H1XS effects operation of both of the connect relays H1XRa and H1XRb, whereby the operated connect relay H1XRb effects heating of the two sections of the heating unit 601a and 601b with the result that the hotplate H1X is heated at the relatively high heating rate.

Subsequently when the temperature of the hotplate H1X approaches the temperature that is preset by the controller H1C, the mismatch previously mentioned is only modest, whereby the plate current of the tube 308 is only modest so that only the test relay 365a is operated, the test relay 365b being marginal remains restored. Upon operating the test relay 365a interrupts at the contacts 366'' the direct connection between the neutral line 307 and the conductor 358 and completes at the contacts 366' an alternative connection, including the resistor 603 and the contacts 366''', between the neutral conductor 307 and the conductor 358. Accordingly, the two connect relays H1XRa and H1XRb are energized in series relation with the resistor 603, so that only the connect relay H1XRa is operated, the connect relay H1XRb remaining in its restored position as it is of the marginal type. Thus when the connect relay H1XRa is operated alone, only the inner section of the heating unit 601a is energized, whereby the heating rate of the hotplate H1X is established at the low rate.

Still subsequently, when the temperature of the hotplate H1X substantially matches the temperature that is preset by the controller H1C, the mismatch previously mentioned is substantially nil; whereby the plate current of the tube 308 is substantial, so that both of the test relays 365a and 365b are operated to interrupt the connection between the neutral line 307 and the conductor 358, with the result that neither of the connect relays H1XRa and H1XRb is operated, so as to terminate the heating of the two sections of the heating unit 601a—601b.

In passing, it is noted that when the connect relay H1XRa is operated alone, as described above, it completes at its contacts 353' a holding circuit for energizing the winding thereof in series with the winding of the connect relay H1XRb that also includes the resistor 604, whereby the connect relay H1XRb is not operated in this holding circuit by virtue of the inclusion of the resistor 604, the connect relay H1XRb being of the marginal type, as previously noted.

In view of the foregoing explanation of the mode of operation of the modified form of the automatic temperature control system of Fig. 6, it will be understood that when the controller H1C occupies its operated position, the rate of heating of the hotplate H1X is selectively established depending upon the temperature thereof, whereby the hotplate H1X is heated at a high rate in the event the temperature is considerably removed from the preset temperature, whereas it is heated at a low rate when the temperature thereof is only moderately removed from the preset temperature, while it is not heated at all when the temperature thereof is substantial at the preset temperature. This arrangement is very advantageous in view of the fact that in each cycle of the test unit H1XT the temperature of the hotplate H1X is effectively tested and the heating rate is accordingly selected for the next cycle of the automatic temperature control system depending upon the results of the test mentioned in the present cycle of the automatic temperature control system; which arrangement prevents overshoot and undershoot of the temperature of the hotplate H1X with respect to the preset temperature during the normal operation of the hotplate H1X.

In passing, it is mentioned that this modified form of the automatic temperature system may be incorporated in only certain ones of the four hotplates H1 to H4, inclusive, in order to render the temperature control of the same more highly selective, as explained above; whereby a mixed arrangement of the controls for these four hotplates is altogether feasible.

In view of the foregoing, it is apparent that there has been provided an automatic temperature control system for an electric range, or the like, that accommodates the independent presetting and subsequent corresponding independent maintaining of desired temperatures of a plurality of heating units incorporated in the range. Moreover, in the arrangement, at least one of the heating units is operatively associated with a heating platform to provide a hotplate and at least another of the heating units is operatively associated with structure defining an oven. Finally, in the arrangement, a common tester is provided which is operative cyclically to test the match or mismatch between the actual temperatures of the several heating units and the preset temperatures thereof thereby to govern selectively the corresponding heating of the several heating units.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cooking appliance, a plurality of electric heating units, a plurality of temperature sensing units respectively corresponding to said heating units, each one of said temperature sensing units being arranged to sense the temperature of a medium heated by the corresponding one of said heating units, a plurality of manually operable controllers respectively corresponding to said heating units, each one of said controllers having an off position and a plurality of control positions respectively corresponding to different desired temperatures of the medium heated by the corresponding one of said heating units, said temperature sensing units and said controllers being respectively paired to provide a corresponding plurality of test sets respectively corresponding to said heating units, any given test set being in a demand condition only when the particular temperature sensed by the corresponding given temperature sensing unit is lower than the particular control position of the corresponding given controller, cyclically operative mechanism, means responsive to operation of any one of said controllers into any one of its control positions for initiating operation of said mechanism and responsive to operation of each of said controllers into its off position for arresting operation of said mechanism, a tester controlled by operation of said mechanism for cyclically testing said test sets with respect to the demand conditions thereof, switching apparatus having access to said heating units, means controlled by said tester for selectively operating said switching apparatus to select each one of said heating units corresponding to one of said test sets that is tested as being in a demand condition, and means for supplying electric power to said switching apparatus and therefrom to each selected one of said heating units.

2. The cooking appliance set forth in claim 1, wherein at least one of said heating units is operatively associated with a heating platform and the corresponding one of said temperature sensing units is arranged to sense the temperature of a cooking vessel supported by said heating platform.

3. The cooking appliance set forth in claim 1, wherein at least one of said heating units is operatively associated with a baking oven and the corresponding one of said temperature sensing units is arranged to sense the cooking temperature of said baking oven.

4. The cooking appliance set forth in claim 1, wherein one of said heating units is operatively associated with a heating platform and the corresponding one of said temperature sensing units is arranged to sense the temperature of a cooking vessel supported by said heating platform, and wherein another of said heating units is operatively associated with a baking oven and the corresponding other of said temperature sensing units is arranged to sense the cooking temperature of said baking oven.

5. In a cooking appliance, a plurality of electric heating units, a plurality of temperature sensing units respectively corresponding to said heating units, each one of said temperature sensing units being arranged to sense the temperature of a medium heated by the corresponding one of said heating units, a plurality of manually operable controllers respectively corresponding to said heating units, each one of said controllers having an off position and a plurality of control positions respectively corresponding to different desired temperatures of the medium heated by the corresponding one of said heating units, said temperature sensing units and said controllers being respectively paired to provide a corresponding plurality of test sets respectively corresponding to said heating units, any given test set being in a demand condition only when the particular temperature sensed by the corresponding given temperature sensing unit is lower than the particular control position of the corresponding given controller, cyclically operative mechanism, means responsive to operation of any one of said controllers into any one of its control positions for initiating operation of said mechanism and responsive to operation of each of said controllers into its off position for arresting operation of said mechanism, a tester controlled by operation of said mechanism for cyclically testing said test sets with respect to the demand conditions thereof, switching apparatus having access to said heating units, means controlled jointly by operation of said mechanism and by said tester for cyclically operating said switching apparatus to select each one of said heating units corresponding to one of said test sets that is tested as being in a demand condition, and means for supplying electric power to said switching apparatus and therefrom to each selected one of said heating units.

6. The cooking appliance combination set forth in claim 5, wherein said switching apparatus essentially comprises a plurality of relays respectively corresponding to said heating units.

7. In a cooking appliance, a plurality of electric heating units, a plurality of temperature sensing units respectively corresponding to said heating units, each one of said temperature sensing units being arranged to sense the temperature of a medium heated by the corresponding one of said heating units, a plurality of manually operable controllers respectively corresponding to said heating units, each one of said controllers having an off position and a plurality of control positions respectively corresponding to different desired temperatures of the medium heated by the corresponding one of said heating units, said temperature sensing units and said controllers being respectively paired to provide a corresponding plurality of test sets respectively corresponding to said heating units, any given test set being in a demand condition only when the particular temperature sensed by the corresponding given temperature sensing unit is lower than the particular control position of the corresponding given controller, cyclically operative mechanism, means responsive to operation of any one of said controllers into any one of its control positions for initiating operation of said mechanism and responsive to operation of each of said controllers into its off position for arresting operation of said mechanism, a tester controlled by operation of said mechanism for cyclically testing said test sets with respect to the demand conditions thereof, switching apparatus having access to said heating units, means controlled jointly by operation of said mechanism and by said tester for cyclically operating said switching apparatus to select each one of said heating units corresponding to one of said test sets that is tested as being in a demand condition, a source of electric power, a master switch having closed and open positions respectively connecting and disconnecting said source with respect to said switching apparatus and thus with respect to each selected one of said heating units, and means controlled by operation of said mechanism for cyclically operating said master switch between its closed and open positions.

8. The cooking appliance combination set forth in claim 7, wherein said master switch constitutes a circuit breaker and is operated into its open position preceding each operation of said switching apparatus, so that said switching apparatus is protected by said circuit breaker against the interruption of an electric current.

9. In a cooking appliance, a plurality of electric heating units, a plurality of temperature sensing resistors respectively corresponding to said heating units, each one of said temperature sensing resistors having a high temperature coefficient of resistance and arranged in heat-exchange relation with a medium heated by the corresponding one of said heating units so that each of said temperature sensing resistors has an effective resistance that is related to the temperature of the medium that is heated by the corresponding one of said heating units, a plurality of manually adjustable control resistors respectively corresponding to said heating units, said temperature sensing resistors and said control resistors being respectively paired to provide a corresponding plurality of test sets respectively corresponding to said heating units, a bridge circuit, switching apparatus selectively operative to connect any one of said test sets to said bridge circuit, said bridge circuit being in a condition of balance when any one of said test sets is connected thereto that is determined by the relationship between the effective resistance of the corresponding one temperature sensing resistor and the adjusted resistance of the corresponding one control resistor, means for operating said switching apparatus cyclically to connect said test sets to said bridge circuit, a source of electric power, switching equipment selectively operative to connect said source to any one of said heating units, and means governed by the condition of balance of said bridge circuit when any one of said test sets is connected thereto for selectively operating said switching equipment selectively to connect said source to the corresponding one of said heating units.

10. In a cooking appliance, a plurality of electric heating units, a plurality of temperature sensing units respectively corresponding to said heating units, each one of said temperature sensing units being arranged to sense the temperature of a medium heated by the corresponding one of said heating units, a plurality of manually operable controllers respectively corresponding to said heating units, each one of said controllers having an off position and a variable on position for presetting the desired temperature of the medium heated by the corresponding one of said heating units within a given temperature range, said temperature sensing units and said controllers being respectively paired to provide a corresponding plurality of test sets respectively corresponding to said heating units, any given test set being in a demand condition only when the particular temperature sensed by the corresponding given temperature sensing unit is lower than the particular temperature preset in the variable on position of the corresponding given controller, cyclically operative mechanism, means responsive to operation of any one of said controllers into its on position for initiating operation of said mechanism and responsive to operation of each of said controllers into its off position for arresting operation of said mechanism, a tester governed by said mechanism for cyclically testing said test sets with respect to the demand conditions thereof, a source of electric power, switching apparatus selectively operative to connect said source to any one of said heating units, and control means governed by said tester for selectively operating said switching apparatus, whereby said switching apparatus is operated in one cycle of said tester to connect said source to a given heating unit in response to testing of the presence of a demand condition of the corresponding given test set and said switching apparatus is operated in a subsequent cycle of said tester to disconnect said source from said given heating unit in response to testing of the absence of a demand condition of said given test set, so that heating of said given heating unit corresponds to one or more complete cycles of said mechanism.

11. The cooking appliance combination set forth in claim 10, and further comprising a circuit breaker arranged between said source and said switching apparatus, and means governed by said mechanism for cyclically operating said circuit breaker between its closed and open positions, whereby said switching apparatus is protected by said circuit breaker against the interruption of an electric current.

12. In a cooking appliance, a plurality of electric heating units, a plurality of temperature sensing units respectively corresponding to said heating units, each one of said temperature sensing units being arranged to sense the temperature of a medium heated by the corresponding one of said heating units, a plurality of manually operable controllers respectively corresponding to said heating units, each one of said controllers having an off position and a variable on position for presetting the desired temperature of the medium heated by the corresponding one of said heating units within a given temperature range, said temperature sensing units and said controllers being respectively paired to provide a corresponding plurality of test sets respectively corresponding to said heating units, any given test set being respectively in a heavy demand condition and in a light demand condition and in a no demand condition when the particular temperature sensed by the corresponding given temperature sensing unit is respectively substantially lower than and only moderately lower than and substantially the same as the particular temperature preset in the variable on position of the corresponding given controller, cyclically operative mechanism, means responsive to operation of any one of said controllers into its on position for initiating operation of said mechanism and responsive to operation of each of said controllers into its off position for arresting operation of said mechanism, a tester governed by said mechanism for cyclically testing said test sets with respect to the demand conditions thereof, a source of electric power, switching apparatus selectively operative to complete respective high and low supply connections from said source to any one of said heating units, any given heating unit being heated at respective high and low heating rates in response to completion of respective ones of said high and low supply connections, and control means governed by said tester for selectively operating said switching apparatus, whereby said switching apparatus is selectively operated in each cycle of said tester respectively to complete the high supply connection or the low supply connection or no supply connection to a given heating unit in response to respective testing of a high demand condition or a low demand condition or no demand condition of the corresponding given test set.

13. In a cooking appliance, an electric heating unit, a source of electric power, switching apparatus having first and second positions respectively completing high and low supply connections from said source to said heating unit and a third position interrupting said supply connections, said heating unit being heated at respectively high and low heating rates in response to completion of respective ones of said high and low supply connections, a temperature sensing unit arranged to sense the temperature of a medium heated by said heating unit, a manually operable controller having an off position and a variable on position for presetting the desired temperature of the medium heated by said heating unit, said temperature sensing unit and said controller constituting a test set that is respectively in a heavy demand condition and in a light demand condition and in a no demand condition when the particular temperature sensed by said temperature sensing unit is respectively substantially lower than and only moderately lower than and substantially the same as the particular temperature preset in the variable on position of said controller, a tester selectively operative to test the particular demand condition of said test set, means responsive to operation of said controller into its on position for initiating operation of said tester and responsive to operation of said controller into its off position for arresting operation of said tester, and control means governed by said tester for selectively operating said switching apparatus, whereby said switching apparatus is respectively operated into its first and second and third positions in response to respective testing of a high demand condition and a low demand condition and a no demand condition of said test set.

14. The cooking appliance combination set forth in claim 13, wherein said tester is operated cyclically, so that in each cycle of operation thereof said switching apparatus is selectively operated into the required one of its three positions named based upon the particular demand test of said tester in the cycle.

15. In a cooking appliance, an electric hotplate, a source of electric power, switching apparatus having first and second positions respectively completing high and low supply connections from said source to said hotplate and a third position interrupting said supply connections, said hotplate being heated at respective high and low heating rates in response to completion of respective ones of said high and low supply connections, a temperature sensing unit operatively associated with said hotplate and arranged to sense the temperature of a cooking vessel supported by said hotplate, a manually operable controller having an off position and a variable on position for presetting the desired temperature of a cooking vessel supported by said hotplate, said temperature sensing unit and said controller constituting a test set that is respectively in a heavy demand condition and in a light demand condition and in a no demand condition when the particular temperature sensed by said temperature sensing unit is respectively substantially lower than and only moderately lower than and substantially the same as the particular temperature preset in the variable on position of said controller, a tester selectively operative to test the particular demand condition of said test set, means responsive to operation of said controller into its on position for initiating operation of said tester and responsive to operation of said controller into its off position for arresting operation of said tester, and control means governed by said tester for selectively operating said switching apparatus, whereby said switching apparatus is respectively operated into its first and second and third positions in response to respective testing of a high demand condition and a low demand condition and a no demand condition of said test set.

16. In a baking oven, an electric heating unit operatively associated with said oven, a source of electric power, a temperature sensing unit arranged to sense the temperature of said oven, a first manually operable controller having an off position and a variable on position for presetting the desired temperature of said oven, a second manually operable controller having a regular bake position and a time bake position, clock mechanism having a variable start time position and a variable stop time position and provided with manually operable facility for selectively setting a desired start time and a desired stop time, cycle mechanism, means responsive to operation of said first controller into its on position when said second controller is in its regular bake position for initiating operation of said cycle mechanism and responsive to operation of said first controller into its on position when said second controller is in its time bake position for preparing operation of said cycle mechanism and responsive to operation of said first controller into its off position for arresting operation of said cycle mechanism, means governed by said clock mechanism for initiating operation of said prepared cycle mechanism at a set desired start time and for arresting operation of said prepared cycle mechanism at a set desired stop time, a tester operative to test the match between the particular temperature sensed by said temperature sensing unit and the particular temperature preset in the variable on position of said first controller, means governed by said cycle mechanism for cyclically operating said tester, and switching apparatus selectively operated by said tester for selectively connecting said source to said heating unit.

17. In an electric range, first and second baking ovens, first and second heating units respectively operatively associated with said first and second ovens, a source of electric power, first and second temperature sensing units respectively arranged to sense the temperatures of said first and second ovens, first and second manually operable temperature controllers respectively corresponding to said first and second ovens, each of said temperature controllers having an off position and a variable on position for presetting the desired temperature of the corresponding oven, first and second manually operable bake controllers respectively corresponding to said first and second ovens, each of said bake controllers having a regular bake position and a time bake position, clock mechanism having a variable start time position and a variable stop time position and provided with manually operable facility for selectively setting a desired start time and a desired stop time, cycle mechanism, means responsive to operation of either one of said temperature controllers into its on position when the corresponding one of said bake controllers is in its regular bake position for initiating operation of said cycle mechanism and responsive to operation of either one of said temperature controllers into its on position when the corresponding one of said bake controllers is in its time bake position for preparing operation of said cycle mechanism and responsive to operation of both of said temperature controllers into their off positions for arresting operation of said cycle mechanism, means governed by said clock mechanism for initiating operation of said prepared cycle mechanism at a set desired start time and for arresting operation of said prepared cycle mechanism at a set desired stop time, a tester operative to test the match between the particular temperature sensed by each one of said temperature sensing units and the particular temperature preset in the variable on position of the corresponding one of said temperature controllers, means governed by said cycle mechanism for cyclically operating said tester, and switching apparatus selectively operated by said tester for selectively connecting said source to said heating units.

18. In a broiling and baking oven, an electric heating unit operatively associated with said oven, a source of electric power, a temperature sensing unit arranged to sense the temperature of said oven, a first manually operable controller having an off position and a broil position and a variable on position for presetting the desired baking temperature of said oven, a second manually operable controller having a regular bake position and a time bake position, clock mechanism having a variable start time position and a variable stop time position and provided with manually operable facility for selectively setting a desired start time and a desired stop time, cycle mechanism, means responsive to operation of said first controller into its on position when said second controller is in its regular bake position for initiating operation of said cycle mechanism and responsive to operation of said first controller into its on position when said second controller is in its time bake position for preparing operation of said cycle mechanism and responsive to operation of said first controller into its off position for arresting operation of said cycle mechanism, means governed by said clock mechanism for initiating operation of said prepared cycle mechanism at a set desired start time and for arresting operation of said prepared cycle mechanism at a set desired stop time, a tester operative to test the match between the particular temperature sensed by said temperature sensing unit and the particular temperature preset in the variable on position of said first controller, means governed by said cycle mechanism for cyclically operating said tester, and switching apparatus selectively operated by said tester for selectively connecting said source to said heating unit, said first controller also being operative into its broil position to complete a supply connection from said source to said heating unit independently of said switching apparatus.

References Cited in the file of this patent

UNITED STATES PATENTS

| | | |
|---|---|---|
| 1,511,050 | Collins et al. | Oct. 7, 1924 |
| 1,898,124 | Harrison | Feb. 21, 1933 |
| 1,925,463 | Schmidt | Sept. 5, 1933 |
| 2,327,632 | Frazier | Aug. 24, 1945 |
| 2,591,849 | McDowell | Apr. 18, 1952 |